United States Patent Office 2,920,013
Patented Jan. 5, 1960

---

2,920,013

ANTHELMINTIC COMPOSITIONS CONTAINING NITROSTILBENES AND METHOD OF USING

Robert J. Shaver, Midland, Mich., assignor to The Dow Chemical Company, Midland, Mich., a corporation of Delaware No Drawing. Application January 9, 1958
Serial No. 707,846

15 Claims. (Cl. 167—53)

This invention relates to animal husbandry and is particularly concerned with a method and composition for the control of internal parasites in domestic animals.

Domestic animals are subject to attack by a number of different internal parasites. A majority of these parasites are classified as Helminthes and among the helminthic parasites, the nematodes are the most common parasites of domestic animals. Certain of these Helminthes such as lungworms, stomach worms and gastro-intestinal worms, including the strongyloids, cooperids and ascarids, are the causative agents of diseases such as ascariasis, trichostrongylosis and gross parasitism. The diseases are prevalent in cattle, sheep, swine, dogs and other animals, and are characterized by symtoms such as diarrhea, emaciation, anemia, coughing spells or general weakness. The prevalence of these diseases constitutes a major economic problem in the livestock industry.

The nematodes grow and mature in various organs but particularly in the gastro-intestinal tract of their host. In the normal life cycle, the eggs pass out with the fecal droppings, hatch and reach their infective larval stage, whereupon they are ingested during grazing or, as is the case with hookworms, enter the body through the skin. In the case of ascarids, the infective eggs may be swallowed. The swallowed eggs or larvae mature primarily in the gastro-intestinal tract, but during the maturing process they may migrate or be carried by the blood to other parts of the body such as the lungs or the liver. During maturation and in the adult stage, the parasites may erode the tissues bringing about hemorrhage, anemia, weakness, serious digestive disturbances and intestinal necrosis. In addition, there may be secondary invasion by bacteria. Invasion by bacteria is especially common when lungs are affected by lungworms. Other difficulties caused by both adult and migrating forms are mechanical blocking of the air passages, the intestinal tract, or the common bile ducts. Animals, if they do not rapidly succumb to gross parasitism are oftentimes rendered economically valueless by lowered vitality and poor growth and reproduction.

Numerous remedies have been suggested and made available for the control of internal parasites. Many of these materials have been of little efficacy while others have had an adverse effect upon the metabolism of the treated animal. Some of the difficulties encountered in the use of such materials include a depressant effect on the central nervous system, hemolysis producing a serious and perhaps fatal anemia, injury to the liver and/or kidneys, gastro-intestinal irritation, photo sensitization, and photosensitized keratitis manifested by ulcerations of the cornea. These and other toxic effects have made the use of many of the remedies hazardous and unprofitable. Thus, the need for inexpensive methods for the control of nematode caused infections is well recognized as constituting one of the major problems in animal husbandry.

It is an object of the present invention to provide a new and improved practice in animal husbandry. A further object is to provide a method for the control of parasitic nematodes in animals. Another object is to provide a new method for the control of nematode diseases of the gastro-intestinal tract of animals. An additional object is the provision of a novel method for benefitting animals including the control of gastritis and other diseases caused by nematodes. A further object is the provision of novel compositions adapted to be employed in the new method. Other objects will become apparent from the following specification and claims.

The new method for benefitting animals comprises dosing animals with a nitrostilbene of the formula

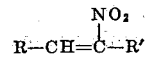

wherein R and R' each represent a member of the group consisting of aryl and haloaryl, to control diseases caused by nematode parasites and particularly those of the gastro-intestinal tract. The term "aryl," as herein employed, refers to phenyl radicals unsubstituted or substituted by one or more methyl groups. The term "haloaryl," as herein employed, refers to phenyl radicals or methylphenyl radicals which contain at least one halogen attached to the benzene ring of the aromatic nucleus. Where there is more than one halogen, the halogen atoms may be alike or different. These compounds are yellow or orange colored crystalline solids soluble in organic solvents such as ethanol, acetone, xylene and kerosene and of low solubility in water. They are adapted to be readily and conveniently administered to animals in amounts sufficient to control internal parasites, including ascarids and hookworms, lungworms, stomach and intestinal worms such as cooperids, Haemonchus, Trichostrongyles and Ostertagia without adversely affecting the animal.

The oral administration or feeding of warm blooded animals of a chemotherapeutic dose or a parasiticidal dose of the nitrostilbenes, or dose sufficient to control internal parasites, is essential and critical for the practice of the present invention. The amount of nitrostilbene compound to be administered to the warm blooded animals must take into account such factors as whether the administration is to be made in a single dose or in multiple doses. When the administration is to be made in a single dose, the preferred dosage is from 60 to 500 milligrams per kilogram of the host animal's body weight. If desired, this dose may be administered in several portions over a period of 24 hours. When the administration is to be made in daily doses over a period of from several days to three weeks, good results are obtained with daily dosages of from 20 to 60 milligrams per kilogram of body weight.

The method of the present invention may be carried out by the oral administration or force feeding of a chemotherapeutic dose of the unmodified nitrostilbene compounds. For the control of intestinal parasites, the method is accomplished by the administration of an anthelmintic or vermifuge dose of the compounds. In such procedures, the nitrostilbene compounds are conveniently administered in a gelatin capsule or in the form of a tablet. However, the present invention also embraces the employment of a liquid, drench, pellet, powder, mash, mixed grain ration or other animal feed compositions containing one or more of the nitrostilbene compounds. In such usage, the compounds may be modified with one or more of a plurality of additaments or innocuous ingestible adjuvants including water, ethanol, skimmed milk, liquid or solid surface active dispersing agents, ingestible powders and commercial animal feeds, concentrates or supplements. Such augmented compositions are adapted to be fed to animals to supply the desired dosage of active agent or to be employed as concentrates and subsequently diluted with additional carrier to produce the ultimate compositions.

The exact concentration of the nitrostilbene compound to be employed in the compositions may vary provided that a sufficient amount of the compositions is ingested by the animals to provide the required dosage of active agent. For example, where individual administration is preferred, liquid, drench or solid compositions containing from 2 to 95 percent by weight of the nitrostilbene compound may be employed to supply the desired dosage. Where the compound is provided as a constituent of the principal feed ration, the required dosage may be supplied with feed compositions containing from 0.01 to 1 percent by weight of active agent. Where the compound is provided as a constituent of feed supplements for cattle or other animals, good results are obtained with supplements containing from 0.5 to 5 percent by weight of the nitrostilbene compound. In compositions to be employed as concentrates, the active ingredient may be present in a concentration of from 5 to 95 percent by weight.

Liquid compositions containing the desired amount of one of the nitrostilbene compounds may be prepared by dispersing the compound in water with the aid of a suitable ionic or non-ionic surface active dispersing agent such as glycerol and sorbitan esters. The aqueous compositions may contain one or more water-immiscible oils as a solvent for the active agent. In such compositions, the water, oil and emulsifying agent constitute an aqueous emulsion carrier.

The nitrostilbene compound may be formed into wettable powders by grinding with an innocuous solid such as bentonite, fuller's earth or attapulgite and a small amount of wetting agent. These compositions may be administered in the form of capsules or tablets or dispersed in animal feed and such feed used to supply a part of the entire ration.

In the preparation of solid feed compositions, the nitrostilbene compounds may be mechanically ground with grain or dry feed compositions, or made up into capsules or tablets such as described above and then mixed in the feed. The feed may be given dry or with added water to give it mush-like consistency. Also, the compound may be dissolved in an edible oil such as coconut or cottonseed oil, and the resulting mixture dispersed in the feed. These edible oil compositions may contain one of the aforementioned emulsifying materials as a dispersing agent.

The following examples illustrate the invention but are not to be construed as limiting:

*Example 1*

A dog weighing 5.4 kilograms and voiding numerous tapeworm ova and proglottids in the feces was dosed with 2,4-dichloro-α'-nitrostilbene. In such operations, the nitrostilbene compound was administered as a single dose in gelatin capsule in an amount sufficient to provide a dosage of 100 milligrams per kilogram of body weight. Seven days later, a second dose was administered as previously described at 200 milligrams per kilogram of body weight. Four days following the administration of the second dose, the dog was necropsied and found to be free of tapeworms.

*Example 2*

A dog weighing 6.9 kilograms was dosed with α-nitrostilbene in a single dose in a gelatin capsule in an amount sufficient to provide 200 milligrams per kilogram of body weight. Prior to the dosing, the dog was found to be expelling numerous tape worm ova and proglottids in the feces. At necropsy ten days later, the dog was examined and found to be free of tapeworms.

*Example 3*

2-bromo-α-nitrostilbene was incorporated in a complete mouse feed to prepare a medicated feed composition containing 0.12 percent by weight of the nitrostilbene compound. This medicated feed composition and unmodified mouse feed were fed as sole feed rations to groups of mice which were heavily infested with *Hymenolepis nana* and *Hymenolepis diminuta*. Seven days following the initiation of the diets, the mice were sacrificed and autopsied. An examination of each mouse was made and the medicated mice compared with the unmedicated mice as regards the number of worms to be found in their gastro-intestinal tracts. As a result of the examination there was found a substantially complete control of *Hymenolepis nana* and *Hymenolepis diminuta* in the medicated mice with a continued heavy infestation in the unmedicated group.

*Example 4*

Various nitrostilbene compounds were incorporated in a complete mouse feed to prepare medicated feed compositions containing 0.25 percent by weight of one of the stilbene compounds. These medicated feed compositions and unmodified mouse feed were fed as sole feed rations as described in Example 3 to groups of mice which were heavily infested with *Hymenolepis nana* and *Hymenolepis diminuta*. Seven days following the initiation of the diets, the mice were necropsied and the content of the intestinal tract examined to determine the percent control of tapeworms. The results of the examination are set forth in the following table.

| Test Compound | Percent Control of *Hymenolepis nana* and *Hymenolepis diminuta* |
|---|---|
| 2,4-Dichloro-α'-nitrostilbene | 100 |
| 2-Chloro-α'-nitrostilbene | 100 |
| 3,4-Dichloro-α'-nitrostilbene | 100 |
| 2-Fluoro-α'-nitrostilbene | 100 |
| 2,6-Dichloro-α'-nitrostilbene | 100 |

At the time of the examination, the mice which had received the unmedicated diet were found to be heavily infested with *Hymenolepis nana* and *Hymenolepis diminuta*.

*Example 5*

2,4-dichloro-α'-nitrostilbene and α'-nitrostilbene were incorporated in a complete mouse feed to prepare medicated feed compositions containing 0.25 percent by weight of one of the stilbene compounds. These medicated feed compositions and unmodified mouse feed were fed as a sole feed ration to groups of mice which had a heavy infestation of ascarids within the tissues of their lungs. Seven days following the initiation of the diets, the mice were necropsied and their lung tissues examined to determine the percent control of ascarids. As a result of the examination there was found a 100 percent control of ascarids in the mice which had received the medicated diets. At the time of the observation, the lung tissues of the mice which had received the unmedicated diet were found to be heavily infested with ascarids.

*Example 6*

Gelatin capsules are separately charged with 4-methyl-α-nitrostilbene, 2-chloro-4-methyl-4'-bromo-α-nitrostilbene and 2,4-dimethyl-2',6'-difluoro-α-nitrostilbene substantially as previously described. These capsulated compositions are administered to mature dogs heavily infested with ascarids and at a stage where large numbers of ascarid ova are being voided in the feces.

The administration is made in a single dose of 250 milligrams per kilogram of body weight. As a result of these operations, the dogs are found to expel numerous intact ascarids during the first day following treatment and within six days the feces are found substantially free of ascarid ova.

*Example 7*

Ninety parts by weight of each of 3,4-dichloro-α'-nitrostilbene, 2,4,5 - tribromo - 2',6' - dichloro-α-nitrostilbene and 2,2'-dichloro-α-nitrostilbene are mechanically ground with 10 parts of bentonite to produce medicated compositions containing one of the stilbene compounds.

In a similar manner, medicated compositions are prepared by grinding 50 parts by weight of each of 2-chloro-α'-nitrostilbene, 2,2' - dichloro-4-bromo-6'-fluoro-α-nitrostilbene and 2,6-difluoro-α'-nitrostilbene with 1 part of sorbitan monopalmitate (Span 20) and 49 parts of aluminum magnesium silicate (attapulgite).

In a further operation, 20 parts by weight of each of finely ground 2,2',4-trichloro-α'-nitrostilbene, 4-iodo-α'-nitrostilbene and 2-chloro-2'-fluoro-α'-nitrostilbene are mixed with 80 parts of soybean meal to prepare other medicated compositions containing one of the stilbene compounds.

In an additional operation, 10 parts by weight of each of 2,2'-dichloro-6-fluoro-α'-nitrostilbene, 2,4'-dibromo-α'-nitrostilbene and 2,4,6-trimethyl-α'-nitrostilbene are dispersed in cottonseed oil to prepare compositions containing one of the stilbene compounds in the form of edible oils.

These compositions are adapted to be administered to animals to supply the desired dosage of nitrostilbene compound or to be employed as concentrates and subsequently diluted with additional edible carrier and particularly with commercial animal feeds or supplements to produce feed compositions containing the desired amount of active agent.

The nitrostilbenes employed in this invention may be prepared by the reaction of (1) a Schiff base having the structure

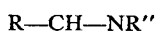

R—CH—NR'' wherein R'' is a lower alkyl radical containing from 3 to 6 carbon atoms, inclusive, with (2) a nitromethane compound having the structure

$$\overset{NO_2}{\underset{CH_2-R'}{|}}$$

The Schiff base reactant may be prepared by condensing an appropriate aldehyde having the formula

RCHO with a primary amine having the formula

R''NH₂ wherein R and R'' are as above defined. It is convenient to prepare the Schiff base as a first step in the synthesis of the halonitrostilbene.

In the preferred method for carrying out this reaction, the aldehyde and a primary alkyl amine, such as normal butylamine, are mixed in a water-immiscible organic solvent such as benzene or cyclohexane. Good results are obtained when substantially equimolar quantities of the reactants or a slight excess of the amine are employed. The resulting mixture is heated to distill out the water of reaction substantially as formed as an azeotropic mixture. After completion of the reaction, the remaining solvent and excess amine, if employed, are removed by distillation and the Schiff base recovered as residue. The latter may be purified by conventional means such as by distillation, if desired.

In the second step of the reaction, the Schiff base and a nitromethane compound are mixed together in a substantially anhydrous lower alkanoic acid such as acetic, propionic or butyric acid. Substantially equimolar proportions of the Schiff base and nitromethane compound and a molar excess of the alkanoic acid are employed. The preferred excess of the acid is from 2 to 3 molar excess. The resulting mixture is allowed to stand at or near room temperature, i.e. from about 20°–40° C., to allow the reaction to proceed. The reaction is usually substantially complete in several hours but the mixture may be allowed to stand for several days without detriment. The desired product frequently precipitates in the reaction mixture. However, a supersaturated solution of the product may be formed and scratching the reaction vessel or seeding the mixture may be necessary to initiate precipitation. Alternatively, the entire mixture may be poured into water to precipitate the desired product. The latter is then recovered by filtration and purified by conventional methods.

The nitromethane compounds employed as starting materials in the preparation of the halonitrostilbenes may be prepared by reacting an appropriate benzyl bromide having the structure R'CH₂Br with sodium nitrite in a solvent such as dimethylformamide at a temperature of from —20° to —15° C. for several hours.

I claim:

1. In the practice of animal husbandry and the control of helminthiasis, the method which comprises administering to domesticated animals a chemotherapeutic dose of a nitrostilbene compound of the formula

$$\overset{NO_2}{\underset{R—CH=C—R'}{|}}$$

wherein R and R' each represent a member of the group consisting of aryl and haloaryl.

2. A method useful for the control of helminthiasis which comprises feeding domesticated animals in the amount of from 60 to 500 milligrams per kilogram of body weight a nitrostilbene compound of the formula

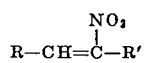

$$R—CH=C\overset{\diagup NO_2}{\diagdown_{R'}}$$

wherein R and R', each represent a member of the group consisting of aryl and haloaryl.

3. A method claimed in claim 1 wherein the animal is caused to ingest a composition comprising the nitrostilbene compound in intimate admixture with an innocuous ingestible adjuvant.

4. A method claimed in claim 1 wherein the nitrostilbene compound is 2,4-dichloro-α'-nitrostilbene.

5. A method claimed in claim 1 wherein the nitrostilbene compound is α-nitrostilbene.

6. A method claimed in claim 1 wherein the nitrostilbene compound is 2-fluoro-α'-nitrostilbene.

7. A method claimed in claim 1 wherein the nitrostilbene compound is 2-bromo-α'-nitrostilbene.

8. A method claimed in claim 1 wherein the nitrostilbene compound is 3,4-dichloro-α'-nitrostilbene.

9. A composition useful for the control of helminthiasis comprising a chemotherapeutic dose of a nitrostilbene compound of the formula

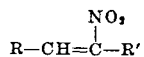

$$\overset{NO_2}{\underset{R—CH=C—R'}{|}}$$

wherein R and R' each represent a member of the group consisting of aryl and haloaryl in intimate admixture with an edible finely divided solid.

10. A composition claimed in claim 9 wherein the nitrostilbene compound is 2,4-dichloro-α'-nitrostilbene.

11. A composition claimed in claim 9 wherein the nitrostilbene compound is α-nitrostilbene.

12. A composition claimed in claim 9 wherein the nitrostilbene compound is 2-fluoro-α'-nitrostilbene.

13. A composition claimed in claim 9 wherein the nitrostilbene compound is 2-bromo-α'-nitrostilbene.

14. A composition claimed in claim 9 wherein the nitrostilbene compound is 3,4-dichloro-α'-nitrostilbene.

15. An animal feed useful for the control of helminthiasis containing from 0.01 to 1 percent by weight of a nitrostilbene compound of the formula $$R-CH=\underset{|}{\overset{NO_2}{C}}-R'$$

wherein R and R' each represent a member of the group consisting of aryl and haloaryl.

References Cited in the file of this patent

Brand: Chem. Abst., vol. 43, 1949, p. 9352c.